United States Patent [19]

Mishima et al.

[11] Patent Number: 5,238,483
[45] Date of Patent: Aug. 24, 1993

[54] ACICULAR MAGNETIC IRON BASED ALLOY PARTICLES FOR MAGNETIC RECORDING AND METHOD OF PRODUCING THE SAME

[75] Inventors: Akio Mishima; Mamoru Tanihara; Yasutaka Ota, all of Hiroshima; Hirofumi Kawasaki, Aki; Kenji Okinaka, Hiroshima; Kunio Ikemoto, Otake; Kousaku Tamari, Hiroshima; Kohji Mori, Hiroshima; Norimichi Nagai, Hiroshima, all of Japan

[73] Assignee: Toda Kogyo Corporation, Hiroshima, Japan

[21] Appl. No.: 921,093

[22] Filed: Jul. 29, 1992

Related U.S. Application Data

[60] Division of Ser. No. 728,328, Jul. 8, 1991, Pat. No. 5,156,922, which is a continuation of Ser. No. 388,025, Jul. 31, 1989, abandoned.

[30] Foreign Application Priority Data

| Jan. 27, 1989 | [JP] | Japan | 1-18585 |
| Mar. 24, 1989 | [JP] | Japan | 1-72492 |
| Jun. 12, 1989 | [JP] | Japan | 1-149996 |

[51] Int. Cl.$^5$ ............................... B22F 9/00
[52] U.S. Cl. ............................................. 75/349
[58] Field of Search .............. 75/349, 369; 427/127, 427/128, 132, 216, 217

[56] References Cited

U.S. PATENT DOCUMENTS

| 3,206,338 | 9/1965 | Miller et al. | 148/105 |
| 3,567,525 | 3/1971 | Graham et al. | 148/31.57 |
| 3,865,627 | 2/1975 | Roden et al. | 117/240 |
| 4,133,677 | 1/1979 | Matsui et al. | 75/0.5 AA |
| 4,165,232 | 8/1979 | Jaeckh et al. | 427/127 |
| 4,251,592 | 2/1981 | Takedoi et al. | 428/403 |
| 4,290,799 | 9/1981 | Schroeder et al. | 75/0.5 A |
| 4,306,921 | 12/1981 | Suzuki et al. | 148/105 |
| 4,318,735 | 3/1982 | Mishima et al. | 75/0.5 AA |
| 4,406,694 | 9/1983 | Mishima et al. | 75/0.5 AA |
| 4,437,881 | 3/1984 | Mishima et al. | 75/0.5 AA |
| 4,469,506 | 9/1984 | Sekiguchi et al. | 75/0.5 AA |
| 4,514,216 | 4/1985 | Mishima et al. | 75/0.5 AA |
| 4,631,090 | 12/1986 | Naumann et al. | 106/304 |
| 4,773,931 | 9/1988 | Mishima et al. | 75/251 |

FOREIGN PATENT DOCUMENTS

| 3911039 | 10/1989 | Fed. Rep. of Germany | 75/349 |
| 62-58605 | 3/1987 | Japan | 75/349 |

*Primary Examiner*—John P. Sheehan
*Attorney, Agent, or Firm*—Nixon & Vanderhye

[57] ABSTRACT

Disclosed herein are acicular magnetic iron based alloy particles for magnetic recording, containing 1.5 to 10 mol % of B based on Fe (calculated as B) and 1.5 to 10 mol % of Co based on Fe (calculated as Co) in the vicinity of the surfaces of said particles and having a saturation magnetization of not less than 125 emu/g and an S.F.D. value of not more than 0.50, and a process for producing the same.

2 Claims, No Drawings

ACICULAR MAGNETIC IRON BASED ALLOY PARTICLES FOR MAGNETIC RECORDING AND METHOD OF PRODUCING THE SAME

This is a division of application Ser. No. 07/728,328, filed Jul. 8, 1991, now U.S. Pat. No. 5,156,922 allowed May 29, 1992, which is a Rule 62 continuation of application Ser. No. 07/388,025, filed Jul. 31, 1989, now abandoned.

BACKGROUND OF THE INVENTION

The present invention relates to acicular magnetic iron based alloy particles for magnetic recording having high coercive force, high saturation magnetization, excellent stability against oxidation and excellent S.F.D. (Switching Field Distribution), and further having good dispersibility ascribed to excellent wetting property and deagglomeration property with respect to a binder, in particular, a binder containing a resin having an acid functional group, or a large specific surface area, and a method of producing such particles.

With the recent development of smaller-sized and lighter-weight magnetic recording apparatuses, the necessity for a recording medium having a higher performance such as a magnetic tape and a magnetic disk has been increasing more and more. In other words, a magnetic recording medium is required to have a higher recording density, higher output characteristic, in particular, an improved frequency characteristic and a lowered noise level.

The properties in which magnetic particles are required to have in order to satisfy the above.described demands on a magnetic recording medium, particularly, magnetic characteristics are a high coercive force and a large saturation magnetization.

Magnetic particles suitable for high-output and high-density recording, namely, magnetic particles having a high coercive force and a large saturation magnetization have recently been developed rapidly. As magnetic particles having such characteristics, acicular magnetic iron based alloy particles obtained by heat-treating acicular goethite particles or acicular hematite particles in a reducing gas are known and put to practical use.

The coercive force of acicular magnetic iron based alloy particles is dependent on the shapes of the particles, in particular, to the aspect ratio (major axis minor axis) and has a tendency of aggrandizing with the increase in the aspect ratio (major axis minor axis) The saturation magnetization has a tendency of increasing with the acceleration of reduction by raising the reducing temperature. The coercive force and the saturation magnetization have reverse correlation. That is, with the progress of reduction, the saturation magnetization is enhanced but the shapes of the particles are collapsed, thereby reducing the coercive force Thus, acicular magnetic iron based alloy particles having both high coercive force and large saturation magnetization are strongly demanded.

Acicular magnetic iron based alloy particles having a high coercive force and a large saturation magnetization are very unstable. More specifically, since the acicular magnetic iron based alloy particles used for a magnetic recording medium are very fine particles having a particle size of not more than 1 μm, the surface activity of the particles is so large that when they are taken out into air after reduction, they rapidly react with the oxygen in air to ignite and release heat. In addition, the oxidation reaction converts these particles into oxides, thereby greatly reducing the magnetic characteristics, in particular, the saturation magnetization, so that it is impossible to obtain acicular magnetic iron based alloy particles having a large saturation magnetization which is an objective of the present invention. For these reasons, acicular magnetic iron based alloy particles having excellent stability against oxidation are strongly demanded.

There is no end to the recent demand for the improvement of the properties of acicular magnetic iron based alloy particles. In addition to a high coercive force, a larger saturation magnetization, an excellent stabilit against oxidation, and an excellent S.F.D. (Switching Field Distribution) is strongly demanded. This fact is clear from the descriptions in Japanese Patent Application Laid-Open (KOKAI) No. 63-26821 (1988): "FIG. 1 shows the relationship between the S.F.D. value, and the recording and reproducing output of the above-described magnetic disc . . . The relationship between the S.F.D. value, and the recording and reproducing output is linear, as is obvious from FIG. 1, which proves that the use of ferromagnetic particles having a small S.F.D. value enhances the recording and reproducing output. That is, in order to increase the recording and reproducing output, the S.F.D. value is preferably as small as possible. In order to obtain a higher output more than the ordinary one, it is necessary that the S.F.D. value is not more than 0.6."

It is pointed out that a resin having an OH group, which has conventionally been widely used as a resin for magnetic recording media is disadvantageous in that the resin needs to contain a large amount of dispersant in order to disperse magnetic particles in a binder and, as a result, the dispersant remaining in the coated film has influence on the surface properties of the coated film such as viscosity, which causes a defect in operation due to a change in the ambient temperature or the like. To solve this problem, the recent tendency is to reduce the amount of dispersant mixed with a binder as much as possible or not used, and various investigations have been made on the kind of the resin, the surface properties of magnetic particles, etc. As the resin, a resin having a COOH group or an $SO_4Na$ group has been put to use in place of the resin having an OH group, and as to the magnetic particles, the improvement of the wetting property and the deagglomeration property with respect to the resin having an acid functional group such as a COOH group, an $SO_4Na$ group, etc. is strongly demanded in order to enhance the dispersibility of a binder.

It is known that the noise level of a magnetic recording medium has a tendency of lowering in proportion to the specific surface area of acicular magnetic iron based alloy particles. This phenomenon is shown in, for example, "FIG. 1" of Japanese Patent Application Laid. Open (KOKAI) No. 58-159231 (1983).

"FIG. 1" shows the relationship between the noise level of a magnetic tape produced from magnetic metal particles and the specific surface area of the particles used. The noise level linearly lowers with the increase in the specific surface area of the particles. Acicular magnetic iron based alloy particles are, therefore, strongly required to have as large a specific surface area as possible.

Various attempts have heretofore been made to improve the properties of acicular magnetic iron based alloy particles. For example, the following methods are known: a method of coating starting material particles such as acicular goethite particles and acicular hematite particles with a cobalt compound in advance and thereafter heat.treating the particles in a reducing atmosphere [Japanese Patent Application Laid-Open (KOKAI) No. 54-122664 (1979) and Japanese Patent Publication No. 58-55203 (1983)]; a method of coating starting material particles with a boron compound in advance and thereafter heat-treating the particles in a reducing atmosphere Japanese Patent Application Laid-Open (KOKAI) No. 57-57459 (1982), Japanese Patent Publication No. 54-42832 (1979), Japanese Patent Application Laid-Open (KOKAI) Nos. 58-48611 (1983), 58-46607 (1983), 59-32881 (1984), 59-5603 (1984), 61-174304 (1986), 61-186410 (1986) and Japanese Patent Publication No. 59-32881 (1984)]; and a method of coating starting material particles with a water-soluble boron compound and the water-soluble salts of Al, Cr, Ge, Nd and the like in advance, and thereafter heat-treating the particles in a reducing atmosphere [Japanese Patent Application Laid.Open (KOKAI) No. 61-186410 186410 (1986)].

Acicular magnetic iron based alloy particles having a high coercive force, a large saturation magnetization, an excellent stability against oxidation and an excellent S.F.D. are now in the strongest demand, but no acicular magnetic iron based alloy particles having all these properties together have been produced by any known method.

More specifically, although acicular magnetic iron based alloy particles having a high coercive force and a large saturation magnetization are generally obtained by the above-described known methods, for example, the stability of saturation magnetization of the acicular magnetic iron based alloy particles produced by the process described in Japanese Patent Application Laid-Open (KOKAI) No. 58-46607 (1983) is about 10 to 30%, and the stability of saturation magnetization of the acicular magnetic iron based alloy particles produced by the process described in Japanese Patent Application Laid-Open (KOKAI) No. 59-5603 (1984) is about 15%, both being insufficient. The S.F.D. of the conventional acicular magnetic iron based alloy particles are also unsatisfactory as will be described later.

Accordingly, acicular magnetic iron based alloy particles which have a high coercive force, a high saturation magnetization, an excellent stability against oxidation and an excellent S.F.D., and further have a good dispersibility ascribed to excellent wetting property and deagglomeration property with respect to a binder, in particular, a binder containing a resin having an acid functional group, or a large specific surface area in addition to the above properties are strongly demanded.

As a result of studies undertaken by the present inventors in order to meet such demand, it has been found that acicular magnetic iron based alloy particles containing 1.5 to 10 mol % of B based on Fe (calculated as B) and 1.5 to 10 mol % of Co based on Fe (calculated as Co) in the vicinity of the surfaces of the particles which are produced by coating the surfaces of acicular goethite particles with a boron compound and a cobalt compound, heat.treating the thus obtained particles in a temperature range of 300° to 600° C. to obtain acicular hematite particles coated with a boron oxide and a cobalt oxide, and heat.treating the thus obtained acicular hematite particles in a temperature range of 300° to 500° C. in a reducing atmosphere, have a high coercive force, a large saturation magnetization, an excellent stability against oxidation and an excellent S.F.D.

It has also been found that by coating the surfaces of the acicular goethite particles further with an aluminum compound and/or a nickel compound so that 1.0 to 10 mol % of Al based on Fe (calculated as Al) and/or 0.3 to 10 mol % of Ni based on Fe (calculated as Ni) in addition to B and Co described above is contained in the vicinity of the surfaces of the acicular magnetic iron based alloy particles, the thus obtained acicular magnetic iron based alloy particles have a good dispersibility ascribed to excellent wetting property and deagglomeration property with respect to a binder, in particular, a binder containing a resin having an acid functional group in addition to the above properties.

It has also been found that by coating the surfaces of the acicular goethite particles further with a silicon compound so that Si in amount of 1.0 to 10 mol % of $SiO_2$ based on Fe (calculated as $SiO_2$) in addition to B and Co described above are contained in the vicinity of the surfaces of the acicular magnetic iron based alloy particles, the thus obtained acicular magnetic iron based alloy particles obtained have a large specific surface area in addition to the above properties.

The present invention has been made on the basis of these findings.

SUMMARY OF THE INVENTION

In a first aspect of the present invention, there is provided acicular magnetic iron based alloy particles for magnetic recording, containing 1.5 to 10 mol % of B based on Fe (calculated as B) and 1.5 to 10 mol % of Co based on Fe (calculated as Co) in the vicinity of the surfaces of said particles and having a saturation magnetization of not less than 125 emu/g and an S.F.D. value of not more than 0.50.

In a second aspect of the present invention, there is provided acicular magnetic iron based alloy particles for magnetic recording comprising acicular magnetic iron based alloy particles containing 1.5 to 10 mol % of B based on Fe (calculated as B), 1.5 to 10 mol % of Co based on Fe (calculated as Co) and 1.0 to 10 mol % of Al based on Fe (calculated as Al) and/or 0.3 to 10 mol % of Ni based on Fe (calculated as Ni) in the vicinity of the surfaces of said particles and having a saturation magnetization of not less than 125 emu/g and an S.F.D. value of not more than 0.50.

In a third aspect of the present invention, there is provided acicular magnetic iron based alloy particles for magnetic recording comprising acicular magnetic iron based alloy particles containing 1.5 to 10 mol % of B based on Fe (calculated as B), 1.5 to 10 mol % of Co based on Fe (calculated as Co) and Si in amount of 1.0 to 10 mol % of $SiO_2$ based on Fe (calculated as $SiO_2$) or Si in amount of 1.0 to 10 mol % of $SiO_2$ based on Fe (calculated as $SiO_2$) and 1.0 to 10 mol % of Al based on Fe (calculated as Al) and having a saturation magnetization of not less than 125 emu/g and an S.F.D. value of not more than 0.50.

In a fourth aspect of the present invention, there is provided a process for producing acicular magnetic iron based alloy particles for magnetic recording containing boron and cobalt in the vicinity of the surfaces thereof and having a saturation magnetization of not less than 125 emu/g and an S.F.D. value of not more than 0.50, comprising the steps of: coating the surfaces of acicular goethite particles with a boron compound and a cobalt compound; heat-treating said particles in a temperature range of 300° to 600° C. to obtain acicular hematite particles coated with a boron oxide and a cobalt oxide; and heat-treating said acicular hematite particles in a temperature range of 300° to 500° C. in a reducing atmosphere.

DESCRIPTION OF THE PREFERRED EMBODIMENTS (1) Acicular magnetic iron based alloy particles according to the present invention which contain 1.5 to 10 mol % of B based on Fe (calculated as B) and 1.5 to 10 mol % of Co based on Fe (calculated as Co) in the vicinity of the surfaces of the particles, have a high coercive force of not less than 1,400 Oe, a large saturation magnetization of not less than 125 emu/g, and a change of saturation magnetization of not more than 15%, preferably not more than 10%, and a small S.F.D. value of not more than 0.50.

(2) Acicular magnetic iron based alloy particles according to the present invention which contain 1.5 to 10 mol % of B based on Fe (calculated as B), 1.5 to 10 mol % of Co based on Fe (calculated as Co) and 1.0 to 10 mol % of Al based on Fe (calculated as Al) and/or 0.3 to 10 mol % of Ni based on Fe (calculated as Ni) in the vicinity of the surfaces of the particles, have a high coercive force of not less than 1,400 Oe, a large saturation magnetization of not less than 125 emu/g, and a change of saturation magnetization of not more than 15%, preferably not more than 10%, a small S.F.D. value of not more than 0.50, and a good dispersibility ascribed to excellent wetting property and deagglomeration property with respect to a binder, in particular, a binder containing a resin having an acid functional group.

(3) Acicular magnetic iron based alloy particles according to the present invention which contain 1.5 to 10 mol % of B based on Fe (calculated as B), 1.5 to 10 mol % of Co based on Fe (calculated as Co) and Si in amount of 1 0 to 10 mol % of $SiO_2$ based on Fe (calculated as $SiO_2$), or Si in amount of 1.0 to 10 mol % of $SiO_2$ based on Fe (calculated as $SiO_2$) and 1.0 to 10 mol % of Al based on Fe (calculated as Al) in the vicinity of the surfaces thereof, have a high coercive force of not less than 1,400 Oe, a large saturation magnetization of not less than 125 emu/g, and a change of saturation magnetization of not more than 15%, preferably not more than 10%, a small S.F.D. value of not more than 0.50, and a large specific surface area of not less than 45.0 $m^2/g$.

Acicular magnetic iron based alloy particles according to the present invention are produced by coating the surfaces of acicular goethite particles with:

(1) a boron compound and a cobalt compound;
(2) a boron compound, a cobalt compound, and an aluminum compound and/or a nickel compound; or
(3) a boron compound, a cobalt compound and a silicon compound, or a silicon compound and an aluminum compound, heat-treating the thus obtained particles in a temperature range of 300° to 600° C. to obtain coated acicular hematite particles, and heat-treating the thus obtained acicular hematite particles in a temperature range of 300° to 500° C. in a reducing atmosphere.

(1) Acicular magnetic iron based alloy particles which is an object of the present invention, having a high coercive force, a large saturation magnetization, an excellent stability against oxidation and an excellent S.F.D. cannot be obtained either in the case of coating the starting material particles only with a boron compound or a cobalt compound, or in the case of introducing boron and/or cobalt elements, into the starting material particles, as will be shown in the later-described comparative examples. That is, it is only by coating the starting material particles with a boron compound and a cobalt compound that acicular magnetic iron based alloy particles according to the present invention are obtained.

(2) Acicular magnetic iron based alloy particles according to the present invention containing aluminum in addition to boron and cobalt in the vicinity of the surfaces of the particles have a large resin adsorption, as will be shown in the later-described examples, so that it is clear that these particles have an excellent wetting property with a binder containing a resin, in particular, a resin having an acid functional group in addition to the properties described in (1).

Acicular magnetic iron based alloy particles according to the present invention containing nickel in addition to boron and cobalt in the vicinity of the surfaces of the particles are excellent in the initial dispersibility, as will be shown in the later-described examples, so that it is clear that these particles have an excellent deagglomeration property with a binder containing a resin, in particular, a resin having an acid functional group in addition to the properties described in (1).

Acicular magnetic iron based alloy particles according to the present invention containing aluminum and nickel in addition to boron and cobalt in the vicinity of the surfaces of the particles are excellent in the gloss, as will be shown in the later-described described examples, so that it is clear that these particles have an excellent dispersibility ascribed to excellent wetting property and deagglomeration property with a binder containing a resin, in particular, a resin having an acid functional group in addition to the properties described in (1).

(3) Acicular magnetic iron based alloy particles according to the present invention containing boron, cobalt and silicon, or silicon and aluminum in the vicinity of the surfaces of the particles have a large specific surface area in addition to the properties of the particles containing boron and cobalt in the vicinity of the surfaces thereof described in (1).

The acicular goethite particles used in the present invention can be produced by any ordinary method such as a method of oxidizing a suspension containing ferrous hydroxide and having a pH of not less than 11 obtained by mixing an aqueous ferrous salt solution and not less than an equivalent of an alkali solution, by passing an oxygen-containing gas thereinto a temperature of not higher than 80° C. [Japanese Patent Publication No. 39-5610 (1964)] and a method of oxidizing a suspension containing $FeCO_3$ obtained by reacting an aqueous ferrous salt solution with an alkali carbonate, by passing an oxygen-containing gas thereinto [Japanese Patent Application Laid Open (KOKAI) No. 50-80999 (1975)]. By changing reaction conditions, additives, etc. in these method, it is possible to use particles having a particle length of 0.1 to 0.4 μm and an aspect ratio (major axis:minor axis) of 5:1 to 20:1. In the producing reaction of the goethite particles, the metal ions of Co, Ni, Zn, Mn, Cu, etc. which are generally added in order to improve the properties of the acicular magnetic iron based alloy particles may be added.

In order to obtain acicular magnetic iron based alloy particles having a preferable S.F.D. value, especially, an S.F.D. value of not more than 0.47, the acicular goethite particles having a uniform particle size and being free of dendrites which are obtained by the latter method are used as the starting material particles. In particular, when acicular goethite particles having a uniform particle size being free of dendrites, having a particle length of 0.18 to 0.3 μm and a large aspect ratio (major axis:minor axis), especially an aspect ratio of not less than 10:1 are used, it is possible to obtain acicular magnetic iron based alloy particles having a more preferable S.F.D. value especially an S.F.D. value of not more than 0.45.

As the acicular goethite particles of the starting material of the present invention, those disclosed, in U.S. Pat. Nos. 4,133,677, 4,130,158, 4,437,881, 3,652,334 and 4,773,931, Japanese Patent Publications No. 55-29577 (1980), No. 60-11446 (1985) and No. 59-48768 (1984), Japanese Patent Application No. 63-325436 (1988) and U.S. patent application Ser. No. 07/342,152 are usable.

As the boron compound in the present invention, $KBO_2$, $H_3BO_3$, $HBO_2$, $B_2O_3$ etc. are usable. The coating of acicular goethite particles with a boron compound is carried out by mixing an aqueous solution containing boron with the acicular goethite particles, stirring the mixture, filtering out the particles and drying the thus obtained particles. The amount of boron coating the particle surfaces is 1.5 to 10 mol % based on Fe (calculated as B). If it is less than 1.5 mol %, sintering of particle and sintering between particles is caused, thereby making it difficult to obtain acicular magnetic iron based alloy particles having a high coercive force. If it is more than 10 mol %, the progress of reduction is obstructed, thereby making it difficult to obtain acicular magnetic iron based alloy particles which are objective particles of the present invention.

As the cobalt compound in the present invention, cobalt sulfate, cobalt nitrate, cobalt acetate, cobalt chloride, cobalt hydroxide, etc. are usable. The coating of acicular goethite particles with a cobalt compound is carried out by mixing an aqueous solution containing cobalt with the acicular goethite particles, stirring the mixture, neutralizing the mixture with an aqueous alkaline solution or an aqueous acid solution, if necessary, filtering out the particles and drying the thus obtained particles. The amount of cobalt coating the particle surfaces is 1.5 to 10.0 mol % based on Fe (calculated as Co). If it is less than 1.5 mol %, the saturation magnetization is not more than 125 emu/g and the S.F.D. value exceeds 0.50, thereby making is difficult to obtain the acicular magnetic iron based alloy particles which are objective particles of the present invention. Even if it is more than 10.0 mol %, it is possible to obtain the acicular magnetic iron based alloy particles which are objective particles of the present invention, but it is meaningless that the acicular magnetic iron based alloy particles contain Co more than necessary.

As the aluminum compound in the present invention, aluminum sulfate, aluminum nitrate, aluminum chloride, aluminum hydroxide, sodium aluminate, alumina sol and the like are usable. The coating of acicular goethite particles with an aluminum compound is carried out by mixing an aqueous solution containing aluminum with the acicular goethite particles, stirring the mixture, neutralizing the mixture with an aqueous alkaline solution or an aqueous acid solution, if necessary, filtering out the particles and drying the thus obtained particles. The amount of aluminum coating the particle surfaces is 1.0 to 10.0 mol %, preferably 1.0 to 5 mol % based on Fe (calculated as Al). If it is less than 1.0 mol %, the wetting property with a resin is sufficient, thereby making it difficult to obtain acicular magnetic iron based alloy particles having a sufficient resin adsorption, or it is difficult to obtain acicular magnetic iron based alloy particles having a large specific surface area. If it is more than 10.0 mol %, the magnetic characteristics such as the coercive force and the saturation magnetization of the acicular magnetic iron based, alloy particles obtained are greatly reduced.

As the nickel compound in the present invention, nickel sulfate, nickel nitrate, nickel chloride, nickel hydroxide, etc. are usable. The coating of acicular goethite particles with a nickel compound is carried out by mixing an aqueous solution containing nickel with the acicular goethite particles, stirring the mixture, neutralizing the mixture with an aqueous alkaline solution or an aqueous acid solution, if necessary, filtering out the particles and drying the thus obtained particles. The amount of nickel coating the particle surfaces is 0.3 to 10.0 mol % based on Fe (calculated as Ni). If it is less than 0.3 mol %, the reducing-temperature lowering-effect is not obtained, and since the deagglomeration property of the particles is insufficient, the improvement of the initial dispersibility, which is one of the objects of the present invention, is insufficient. If it is more than 10.0 mol %, the magnetic crystalline anisotropy become smaller, thereby making it difficult to obtain acicular magnetic iron based alloy particles having a high coercive force, and the saturation magnetization is apt to be lowered.

As the silicon compound in the present invention, colloidal silica, water glass, aqueous silicic acid, silica sol, etc. are usable. The coating of acicular goethite particles with a silicon compound is carried out by mixing an aqueous solution containing a silicon compound with the acicular goethite particles, stirring the mixture, neutralizing the mixture with an aqueous alkaline solution or an aqueous acid solution, if necessary, filtering out the particles and drying the thus obtained particles. The amount of silicon coating the particle surfaces is 1.0 to 10.0 mol % based on Fe (calculated as $SiO_2$). If it is less than 1.0 mol %, it is difficult to obtain the iron based alloy particles having a large specific surface area. If it is more than 10.0 mol %, the saturation magnetization of the acicular magnetic iron based alloy particles obtained is unfavorably lowered.

When the surfaces of acicular goethite particles are coated with a boron compound, cobalt compound, aluminum compound, nickel compound, and silicon compound, the order of coating may be selected as desired, or coating of such compounds may be carried out simultaneously.

The heat-treating temperature in the present invention is 300° to 600° C. If it is lower than 300° C., since high densification of the particles is difficult, it is difficult to retain the shapes of the particles at the time of heat-treating in the subsequent reduction process, thereby lowering the coercive force of the acicular magnetic iron based alloy particles, and whereby it is also difficult to provide an S.F.D. value of not more than 0.5. The reason why the S.F.D. value is not improved is that when the heat-treating temperature is lower than 300° C., recrystallization is insufficient, resulting in the nonuniformity in the shape anisotropy due to the distribution of the shapes of the particles after reduction and the nonuniformity in the crystalline anisotropy due to the structural distribution of Fe, B and Co. If the heat treating temperature is higher than 600° C., sintering of particle and sintering between particles is caused, thereby collapsing the shapes of the particles.

The heat-treating temperature in a reducing atmosphere in the present invention is 300° to 500° C. If it is lower than 300° C., the reduction is insufficient for obtaining acicular magnetic iron based alloy particles having a large saturation magnetization. If it is higher than 500° C., sintering of particle and sintering between particles is caused, thereby collapsing the shapes of the particles and lowering the coercive force of the acicular magnetic iron based alloy particles obtained.

The acicular magnetic iron based alloy particles according to the present invention has a particle length of 0.1 to 0.4 μm, and an aspect ratio (major axis:minor axis) of 5:1 to 15:1.

The acicular magnetic iron based alloy particles after reduction of the present invention can be taken out into air by a known method such as a method of dipping the acicular magnetic iron based alloy particles in an organic solvent such as toluene and a method of replacing the atmosphere after reduction with an inert gas and gradually increasing the oxygen content in the inert gas so as to finally achieving the gradual oxidization of the innert gas by air.

The acicular magnetic iron based alloy particles according to the present invention obtained in this way have:

(1) a coercive force not less than 1,400 Oe, preferably not less than 1450 Oe; a saturation magnetization of not less than 125 emu/g, preferably not less than 130 emu/g; a change of saturation magnetization of not more than 15%, preferably not more than 10%; and an S.F.D. value of not more than 0.50, preferably not more than 0.47;

(2) a gloss of not less than 100%, preferably not less than 110% at a dispersion time of 50%; a gloss of not less than 120%; preferably not less than 130% at a dispersion time of 100%; and a resin adsorption of not less than 1.1 g, preferably not less than 1.4 g; in addition to the properties described in (1); or (3) a specific surface area of not less than 45.0 m²/g, preferably not less than 48 m²/g in addition to the properties described in (1).

The acicular magnetic iron based alloy particles of the present invention having the above-described properties are suitable as the magnetic particles for high-density and high-output recording which are now in the strongest demand.

The present invention will be more precisely explained while referring to Examples as follows.

However, the present invention is not restricted to Examples under mentioned. From the foregoing description, one skilled in the art can easily ascertain the essential characteristics of this invention, and without departing from the spirit and scope thereof, can make various changes and modifications of the invention to adapt it to various usages and conditions.

EXAMPLES

In each of the following Examples and Comparative Examples;

(i) The particle length and the aspect ratio (major axis:minor axis) of the acicular magnetic iron based alloy particles are expressed by the average values measured in electron microphotographs.

(ii) The magnetic characteristics of the acicular magnetic iron based alloy particles were measured by using a vibrating sample magnetometer VSM-3S-15, produced by Toei Kogyo K.K. and applying an external magnetic field up to 10 KOe.

(iii) The stability against oxidation is expressed by $\Delta\sigma s/\sigma s(\%)$ which shows the changes of the saturation magnetization (%) of the sample allowed to stand for 7 days at a temperature of 0° C. and a relative humidity of 90%.

(iv) The S.F.D. value was obtained by using a sheet test piece having a squareness ratio of 0.85 obtained by the following method. The differentiation curve of the magnetization major roop around coercivity of the sample was obtained by using a differentiation circuit of the magnetometer and the half power width of the differentiation curve was measured and the half power width was divided by the coercive force of the peak value of the curve.

A magnetic coating was prepared by charging the following components into a 100-cc plastic bottle in the following ratio and dispersing them with a paint conditioner for 8 hours. The sheet test piece was obtained by applying the magnetic coating to polyethylene film of 25 μm thick to a thickness of 50 μm by using an applicator, and drying the coated film in a magnetic field of 3 to 5 KGauss.

| | |
|---|---|
| 3-mmφ steel ball | 800 parts by weight |
| Magnetic iron based alloy particles | 100 parts by weight |
| Polyurethane resin having a sodium sulfonate group | 20 parts by weight |
| Cyclohexanone | 83.3 parts by weight |
| Methylethyl ketone | 83.3 parts by weight |
| Toluene | 83.3 parts by weight |

(v) The resin adsorption is expressed by the difference between the weight of the resin concentration of the resin liquid having the following composition and the weight of the resin concentration of the supernatant liquid of the coating obtained by charging 20 g of acicular magnetic iron based alloy particles, 56 g of the resin liquid and 120 g of 3-mmφ stainless steel balls into a 100-ml plastic bottle and dispersing them with a paint conditioner for 60 minutes and subjected to centrifugal separation. The weights of both resin concentrations were measured as the nonvolatile matter.

| Composition of resin liquid | |
|---|---|
| Solids content of resin | 3.57 wt % |
| MEK | 32.14 wt % |
| Toluene | 32.14 wt % |
| Anone | 32.14 wt % |

(vi) The dispersibility is expressed by the gloss of the coated film obtained by applying a coating to PET film by an applicator. The coating was produced by charging 15 g of acicular magnetic iron based alloy particles, the resin liquid having the following composition and 120 g of 3-mmφ stainless steel balls into a 100-ml plastic bottle and dispersing them with a paint conditioner for a predetermined time. The dispersing time required for the saturation of the gloss was assumed to be 100%, and the gloss at that time is expressed as the criterion of the dispersibility. The gloss at a dispersion time of 50% is expressed as the criterion of the initial dispersibility.

| Composition of resin liquid | |
|---|---|
| Resin | 3.57 g |
| MEK | 15.17 g |
| Toluene | 15.17 g |
| Cyclohexanone | 15.17 g |

The gloss of the coated film was measured by a gloss-meter produced by Nihon Denshoku Kogyo K.K. at an incident angle of 60° C., and the value is expressed by on the assumption that the gloss of the standard sheet was 89.0%.

PRODUCTION OF ACICULAR HEMATITE PARTICLES

Examples 1 to 10
Comparative Examples 1 to 9

EXAMPLE 1

100 g of acicular goethite particles having a particle length of 0.21 μm and an aspect ratio (major axis:minor axis) of 12:1 was suspended in 1 l of water.

To the suspension, 10.0 g (equivalent to 10.0 wt % based on the acicular goethite particles) of $H_3BO_3$ and 13.0 g (equivalent to 13.0 wt % based on the acicular goethite particles) of $Co(CH_3COO)_2.4H_2O$ were added and the suspension was stirred for 10 minutes The pH of the suspension was 6.2. $NH_4OH$ was then added until the pH of the suspension became 9.3. The acicular α-FeOOH particles were filtered out and dried, thereby obtaining the acicular α-FeOOH particles coated with boron and cobalt.

50 g of the thus obtained acicular goethite particles coated with boron and cobalt were heat-treated at 400° C. in air to obtain acicular hematite particles coated with a boron oxide and a cobalt oxide. According to the observation of the electron microphotographs, the particles had an average particle length of 0.19 μm and an average aspect ratio (major axis minor axis) of 11:1.

EXAMPLES 2 TO 10, COMPARATIVE EXAMPLES 1 TO 9

Acicular hematite particles were obtained in the same way as in Example 1 except that the kind of the acicular goethite particles, the kind and the content of a boron compound and the time for mixing the boron compound, the kind and the content of a cobalt compound and the time of existence of the cobalt compound and the temperature in the heat-treating process were varied.

The main conditions for producing these particles and the properties of these particles obtained are shown in Table 1.

PRODUCTION OF ACICULAR MAGNETIC IRON BASED ALLOY PARTICLES

Examples 11 to 20
Comparative Examples 10 to 20

EXAMPLE 11

20 g of the acicular hematite particles coated with boron oxide and cobalt oxide obtained in Example 1 were reduced by a hydrogen gas at 410° C. for 6 hours, thereby obtaining acicular magnetic iron based alloy particles.

The surfaces of the acicular magnetic iron based alloy particles obtained by reduction were coated with a stable oxide film so as to prevent rapid oxidation when they were taken out into air. As a result of X-ray fluorometry, it was found that the particles contained 4.7 mol % of B based on Fe and 4.5 mol % of Co based on Fe. According to the observation of the electron microphotographs, the particles had an average particle length of 0.15 μm and an average aspect ratio (major axis:minor axis) of 7:1. As to the magnetic characteristics, the coercive force (Hc) was 1,530 Oe, the saturation magnetization ($\sigma s$) was 133 emu/g, the change of saturation magnetization was 8.0% and the S.F.D. value was 0.43.

EXAMPLES 12 TO 20, COMPARATIVE EXAMPLES 10 TO 20

Acicular magnetic iron based alloy particles were obtained in the same way as in Example 11 except that the kind of the acicular hematite particles, and the time and the temperature in the heat-treating process were varied.

The main conditions for producing these particles and the properties of these particles obtained are shown in Table 2.

SURFACE COATING OF ACICULAR GOETHITE PARTICLES

Examples 21 to 39
Reference Examples 1 to 4

EXAMPLE 21

100 g of acicular goethite particles having an average particle length of 0.21 μm and an average aspect ratio (major axis:minor axis) of 12:1 was suspended in 1 l of water.

To the suspension, 10.0 g (equivalent to 10.0 wt % based on the acicular goethite particles) of $H_3BO_3$, 3.0 g (equivalent to 13.0 wt % based on the acicular goethite particles) of $Co(CH_3COO)_2.4H_2O$ and 12 g (equivalent to 12 wt % based on the acicular goethite particles) of $Al(NO_3)_3.9H_2O$ were added and the suspension was stirred for 10 minutes. The pH of the suspension was 4.4. $NH_4OH$ was then added until the pH of the suspension became 9.3. The acicular α-FeOOH particles were filtered out and dried, thereby obtaining the acicular α-FeOOH particles coated with boron compound, cobalt compound and aluminum compound.

EXAMPLES 22 TO 39, REFERENCE EXAMPLES 1 TO 4

Acicular α-FeOOH particles coated with various compounds were obtained in the same way as in Example 21 except that the kind of the acicular goethite particles, the kind and the content of a boron compound, the kind and the content of a cobalt compound and the kind and the content of an aluminum compound or a nickel compound or the kinds and the contents of both alumina and nickel compounds were varied.

The main conditions for producing these particles and the properties of these particles obtained are shown in Tables 3 and 4.

PRODUCTION OF ACICULAR HEMATITE PARTICLES

Examples 40 to 58
Comparative Examples 5 to 8

EXAMPLE 40

50 g of the acicular goethite particles coated with boron, cobalt and aluminum obtained in Example 21 were heat-treated at 400° C. in air to obtain acicular hematite particles coated with a boron oxide, a cobalt oxide and an aluminum oxide. According to the observation of the electron microphotographs, the particles had an average particle length of 0.19 μm and an average aspect ratio (major axis:minor axis) of 11:1 by average value.

EXAMPLE 41 TO 58, REFERENCE EXAMPLES 5 TO 8

Acicular hematite particles were obtained in the same way as in Example 40 except that the temperature in the heat-treating process was varied.

The main conditions for producing these particles and the properties of these particles obtained are shown in Tables 5 and 6.

PRODUCTION OF ACICULAR MAGNETIC IRON BASED ALLOY PARTICLES

Examples 59 to 77
Reference Examples 9 to 12

EXAMPLE 59

20 g of the acicular hematite particles coated with a boron oxide, a cobalt oxide and an aluminum oxide obtained in Example 40 were reduced by a hydrogen gas at 420° C. for 6 hours, thereby obtaining acicular magnetic iron based alloy particles.

The surfaces of the acicular magnetic iron based alloy particles obtained by reduction were coated with a stable oxide film so as to prevent rapid oxidation when they were taken out into air. As a result of X-ray fluorometry, it was found that the particles contained 4.7 mol % of B based on Fe, 4.5 mol % of Co based on Fe and 2.6 mol % of Al based on Fe. According to the observation of the electron microphotographs, the particles had an average particle length of 0.15 μm and an average aspect ratio (major axis:minor axis) of 7:1. As to the magnetic characteristics, the coercive force, (Hc) was 1,540 Oe, the saturation magnetization ($\sigma$s) was 133 emu/g, the oxidative stability was 8.0% and the S.F.D. value was 0.42. The resin adsorption content was 1.4. As to the dispersibility, the gloss at a dispersion time of 50% was 110% and the gloss at a dispersion time of 100% was 120%.

EXAMPLES 60 TO 77, REFERENCE EXAMPLES 9 TO 12

Acicular magnetic iron based alloy particles were obtained in the same way as in Example 59 except that the kind of the acicular hematite particles and the temperature in the heat-treating process were varied.

The main conditions for producing these particles and the properties of these particles obtained are shown in Tables 7 and 8.

SURFACE COATING OF ACICULAR GOETHITE PARTICLES

Examples 78 to 90
Reference Examples 13 to 14

EXAMPLE 78

100 g of acicular goethite particles having an average particle length of 0.20 μm and an average aspect ratio (major axis:minor axis) of 13:1 was suspended in 1 l of water.

To the suspension, 10.0 g (equivalent to 10.0 wt % based on the acicular goethite particles) of $H_3BO_3$, 13.0 g (equivalent to 13.0 wt % based on the acicular goethite particles) of $Co(CH_3COO)_2.4H_2O$ and 9.5 g (equivalent to 9.5 wt % based on the acicular goethite particles) of colloidal silica were added and the suspension was stirred for 10 minutes. The pH of the suspension was 6.1. $NH_4OH$ was then added until the pH of the suspension became 9.3. The acicular $\alpha$-FeOOH particles were filtered out and dried, thereby obtaining the acicular $\alpha$-FeOOH particles coated with boron compound, cobalt compound and silicon compound.

EXAMPLES 79 TO 90, REFERENCE EXAMPLES 13 AND 14

Acicular $\alpha$-FeOOH particles coated with various compounds were obtained in the same way as in Example 78 except that the kind of the acicular goethite particles, the kind and the content of a boron compound, the kind and the content of a cobalt compound, the kind and the content of a silicon compound and the kind or the content of an aluminum compound, if any, were varied.

The main conditions for producing these particles and the properties of these particles obtained are shown in Tables 9 and 10.

In the case of using water glass as the silicon compound for coating the acicular goethite particles, after the water glass was added to the suspension with the pH adjusted to 9.3, the suspension was stirred for 10 minutes, and then acetic acid was added to adjust the pH of the suspension to 7.0 to 7.5.

PRODUCTION OF ACICULAR HEMATITE PARTICLES

Examples 91 to 105
Comparative Examples 15 to 16

EXAMPLE 91

50 g of the acicular goethite particles coated with boron compound, cobalt compound and silicon compound obtained in Example 78 were heat-treated at 400° C. in air to obtain acicular hematite particles coated with a boron oxide, a cobalt oxide and a silicon oxide. According to the observation of the electron microphotographs, the particles had an average particle length of 0.19 μm and an average aspect ratio (major axis:minor axis) of 11:1.

EXAMPLES 92 TO 105, REFERENCE EXAMPLES 15 AND 16

Acicular hematite particles were obtained in the same way as in Example 91 except that the temperature in the heat-treating process was varied.

The main conditions for producing these particles and the properties of these particles obtained are shown in Tables 11 and 12.

PRODUCTION OF ACICULAR MAGNETIC IRON BASED ALLOY PARTICLES

Examples 106 to 120
Reference Examples 17 and 18

EXAMPLE 106

20 g of the acicular hematite particles coated with a boron oxide, a cobalt oxide and an aluminum oxide obtained in Example 91 were reduced by a hydrogen gas at 410° C. for 6 hours, thereby obtaining acicular magnetic iron based alloy particles.

The surfaces of the acicular magnetic iron based alloy particles obtained by reduction were coated with a stable oxide film so as to prevent rapid oxidation when they were taken out into air. As a result of X-ray fluorometry, it was found that the particles contained 4.7 mol % of B based on Fe, 4.5 mol % of Co based on Fe and 2.4 mol % of Si based on Fe (calculated as $SiO_2$). According to the observation of the electron microphotographs, the particles proved to have an average particle length of 0.15 μm and an average aspect ratio (major axis:minor axis) of 7:1. As to the magnetic characteristics, the coercive force (Hc) was 1,560 Oe, the saturation magnetization ($\sigma s$) was 133 emu/g, the changes of saturation magnetization was 8.0% and the S.F.D. was 0.43.

EXAMPLES 107 TO 120, COMPARATIVE EXAMPLES 17 AND 18

Acicular magnetic iron based alloy particles were obtained in the same way as in Example 106 except that the kind of the acicular hematite particles and the temperature in the heat-treating process were varied.

The main conditions for producing these particles and the properties of these particles obtained are shown in Tables 13 and 14.

TABLE 1

| Examples and Comparative Examples | Acicular goethite particles | | | Boron compound | | | Cobalt compound | | | Heat treatment temperature (°C.) | Acicular hematite particles | |
|---|---|---|---|---|---|---|---|---|---|---|---|---|
| | Process* | Particle length (μm) | Aspect ratio (Major axis: Minor axis) | Kind | Content (wt %) | Existence** | Kind | Content (wt %) | Existence** | | Particle length (μm) | Aspect ratio (Major axis: Minor axis) |
| Example 1 | A | 0.21 | 12:1 | $H_3BO_3$ | 10 | (a) | $Co(CH_3COO)_2 \cdot 4H_2O$ | 13.0 | (a) | 400 | 0.19 | 11:1 |
| Example 2 | " | 0.21 | 12:1 | " | 10 | (a) | " | 22.0 | (a) | 400 | 0.19 | 11:1 |
| Example 3 | " | 0.21 | 12:1 | " | 20 | (a) | " | 13.0 | (a) | 400 | 0.19 | 11:1 |
| Example 4 | " | 0.21 | 12:1 | $B_2O_3$ | 5.5 | (a) | " | 13.0 | (a) | 400 | 0.19 | 11:1 |
| Example 5 | " | 0.21 | 12:1 | $H_3BO_3$ | 10 | (a) | $Co(NO_3)_2 \cdot 6H_2O$ | 14.9 | (a) | 400 | 0.19 | 11:1 |
| Example 6 | " | 0.21 | 12:1 | " | 10 | (a) | $Co(CH_3COO)_2 \cdot 4H_2O$ | 13.0 | (a) | 350 | 0.20 | 11:1 |
| Example 7 | " | 0.21 | 12:1 | " | 10 | (a) | " | 13.0 | (a) | 500 | 0.19 | 10:1 |
| Example 8 | A | 0.15 | 9:1 | " | 10 | (a) | " | 13.0 | (a) | 400 | 0.14 | 8:1 |
| Example 9 | B | 0.15 | 10:1 | " | 10 | (a) | " | 13.0 | (a) | 400 | 0.12 | 8:1 |
| Example 10 | " | 0.22 | 13:1 | " | 10 | (a) | " | 13.0 | (a) | 400 | 0.19 | 11:1 |
| Comparative Example 1 | A | 0.21 | 12:1 | $H_3BO_3$ | 2.5 | (a) | $Co(CH_3COO)_2 \cdot 4H_2O$ | 13.0 | (a) | 400 | 0.17 | 11:1 |
| Comparative Example 2 | " | 0.21 | 12:1 | — | — | — | " | 13.0 | (a) | 400 | 0.17 | 10:1 |
| Comparative Example 3 | " | 0.21 | 12:1 | $H_3BO_3$ | 10 | (a) | " | 2.8 | (a) | 400 | 0.19 | 11:1 |
| Comparative Example 4 | " | 0.21 | 12:1 | " | 10 | (a) | — | — | — | 400 | 0.19 | 11:1 |
| Comparative Example 5 | " | 0.21 | 12:1 | " | 10 | (a) | $Co(CH_3COO)_2 \cdot 4H_2O$ | 13.0 | (a) | 650 | 0.12 | 9:1 |
| Comparative Example 6 | " | 0.21 | 12:1 | " | 10 | (a) | " | 13.0 | (a) | 250 | 0.21 | 12:1 |
| Comparative Example 7 | " | 0.20 | 11:1 | " | 10 | (a) | " | 13.0 | (b) | 400 | 0.18 | 10:1 |
| Comparative Example 8 | " | 0.22 | 13:1 | " | 10 | (b) | " | 13.0 | (a) | 400 | 0.17 | 11:1 |
| Comparative Example 9 | " | 0.22 | 12:1 | " | 10 | (b) | " | 13.0 | (b) | 400 | 0.17 | 11:1 |

TABLE 1-continued

Example 9

(Note)
*Process A: Aqueous sodium carbonate is used as aqueous alkali solution.
Process B: Aqueous sodium hydroxide is used as aqueous alkali solution.
**(a): Existent on the surfaces of acicular goethite particles.
(b): Existent in aqueous ferrous sulfate.

TABLE 2

| Examples and Comparative Examples | Kind of acicular hematite particle (Example No. and Comparative Example No.) | Heat-Treatment in reducing atmosphere | | Acicular magnetic iron based alloy particles | | | | |
|---|---|---|---|---|---|---|---|---|
| | | Temperature (°C.) | Time (Hour) | B/Fe (mol %) | Co/Fe (mol %) | Coercive force He (Oe) | Saturation magnetization σs (emu/g) | Change of saturation magnetization (%) |
| Example 11 | Example 1 | 410 | 6 | 4.7 | 4.5 | 1530 | 133 | 8.0 |
| Example 12 | Example 2 | 390 | 6 | 4.9 | 7.3 | 1590 | 135 | 8.0 |
| Example 13 | Example 3 | 420 | 6 | 8.3 | 4.6 | 1550 | 131 | 8.0 |
| Example 14 | Example 4 | 410 | 6 | 4.6 | 4.5 | 1520 | 134 | 8.0 |
| Example 15 | Example 5 | 410 | 6 | 4.7 | 4.4 | 1530 | 133 | 7.0 |
| Example 16 | Example 6 | 410 | 6 | 4.7 | 4.5 | 1510 | 130 | 7.0 |
| Example 17 | Example 7 | 410 | 6 | 4.7 | 4.5 | 1540 | 134 | 8.0 |
| Example 18 | Example 8 | 410 | 6 | 4.7 | 4.5 | 1550 | 135 | 8.0 |
| Example 19 | Example 9 | 410 | 6 | 4.7 | 4.5 | 1550 | 134 | 8.0 |
| Example 20 | Example 10 | 410 | 6 | 4.7 | 4.5 | 1570 | 136 | 9.0 |
| Comparative Example 10 | Example 1 | 310 | 6 | 4.7 | 4.5 | 1210 | 112 | 5.0 |
| Comparative Example 11 | Example 2 | 510 | 6 | 4.7 | 4.5 | 1180 | 137 | 15.0 |
| Comparative Example 12 | Comparative Example 1 | 390 | 6 | 1.2 | 4.4 | 1100 | 138 | 11.0 |
| Comparative Example 13 | Comparative Example 2 | 380 | 6 | — | 4.4 | 890 | 140 | 10.0 |
| Comparative Example 14 | Comparative Example 3 | 410 | 6 | 4.6 | 1.0 | 1480 | 123 | 12.0 |
| Comparative Example 15 | Comparative Example 4 | 420 | 6 | 4.5 | — | 1450 | 120 | 14.0 |
| Comparative Example 16 | Comparative Example 5 | 410 | 6 | 4.7 | 4.5 | 1240 | 132 | 15.0 |
| Comparative Example 17 | Comparative Example 6 | 410 | 6 | 4.7 | 4.5 | 1370 | 123 | 11.0 |
| Comparative Example 18 | Comparative Example 7 | 410 | 6 | 4.7 | 4.5 | 1540 | 132 | 15.0 |
| Comparative Example 19 | Comparative Example 8 | 390 | 6 | 1.0 | 4.5 | 1100 | 138 | 13.0 |
| Comparative Example 20 | Comparative Example 9 | 390 | 6 | 1.1 | 4.5 | 1110 | 138 | 18.0 |

| Examples and Comparative Examples | Kind of acicular hematite particle (Example No. and Comparative Example No.) | Acicular magnetic iron based alloy particles | | |
|---|---|---|---|---|
| | | S.F.D. | Particle length (μm) | Aspect ratio (Major axis: Minor axis) |
| Example 11 | Example 1 | 0.43 | 0.15 | 7:1 |
| Example 12 | Example 2 | 0.42 | 0.14 | 6:1 |
| Example 13 | Example 3 | 0.43 | 0.16 | 7:1 |
| Example 14 | Example 4 | 0.43 | 0.15 | 7:1 |
| Example 15 | Example 5 | 0.43 | 0.15 | 7:1 |
| Example 16 | Example 6 | 0.44 | 0.15 | 7:1 |
| Example 17 | Example 7 | 0.43 | 0.15 | 7:1 |
| Example 18 | Example 8 | 0.46 | 0.10 | 6:1 |
| Example 19 | Example 9 | 0.49 | 0.10 | 6:1 |
| Example 20 | Example 10 | 0.48 | 0.16 | 9:1 |
| Comparative Example 10 | Example 1 | 0.42 | 0.15 | 7:1 |
| Comparative Example 11 | Example 2 | 0.65 | 0.07 | 4:1 |
| Comparative Example 12 | Comparative Example 1 | 0.57 | 0.06 | 3:1 |
| Comparative Example 13 | Comparative Example 2 | 0.66 | 0.05 | 3:1 |
| Comparative Example 14 | Comparative Example 3 | 0.56 | 0.16 | 7:1 |
| Comparative Example 15 | Comparative Example 4 | 0.58 | 0.16 | 7:1 |
| Comparative Example 16 | Comparative Example 5 | 0.64 | 0.08 | 5:1 |
| Comparative Example 17 | Comparative Example 6 | 0.53 | 0.14 | 6:1 |
| Comparative Example 18 | Comparative Example 7 | 0.54 | 0.15 | 7:1 |
| Comparative | Comparative | 0.61 | 0.06 | 3:1 |

TABLE 2-continued

|  |  |  |  |  |
|---|---|---|---|---|
| Example 19 Comparative Example 20 | Example 8 Comparative Example 9 | 0.60 | 0.07 | 3:1 |

TABLE 3

| Examples | Acicular goethite particles | | | Boron compound | | Cobalt compound | | Aluminum compound | |
|---|---|---|---|---|---|---|---|---|---|
|  | Process* | Particle length (μm) | Aspect ratio (Major axis: Minor axis) | Kind | Content (wt %) | Kind | Content (wt %) | Kind | Content (wt %) |
| 21 | A | 0.21 | 12:1 | $H_3BO_3$ | 10.0 | $Co(CH_3COO)_2 \cdot 4H_2O$ | 13.0 | $Al(NO_3)_3 \cdot 9H_2O$ | 12 |
| 22 | A | 0.21 | 12:1 | " | 10.0 | " | 13.0 | " | 18 |
| 23 | A | 0.21 | 12:1 | " | 10.0 | " | 13.0 | Alumina sol | 8.1 |
| 24 | A | 0.21 | 12:1 | " | 10.0 | " | 13.0 | " | 22.4 |
| 25 | A | 0.21 | 12:1 | " | 10.0 | " | 13.0 | — | — |
| 26 | A | 0.21 | 12:1 | " | 10.0 | " | 13.0 | — | — |
| 27 | A | 0.21 | 12:1 | " | 10.0 | " | 13.0 | — | — |
| 28 | A | 0.21 | 12:1 | " | 10.0 | " | 13.0 | — | — |
| 29 | A | 0.21 | 12:1 | " | 10.0 | " | 13.0 | $Al(NO_3)_3 \cdot 9H_2O$ | 12 |
| 30 | A | 0.21 | 12:1 | " | 10.0 | " | 13.0 | " | 18 |
| 31 | A | 0.21 | 12:1 | $B_2O_3$ | 5.5 | " | 13.0 | " | 12 |
| 32 | A | 0.21 | 12:1 | $H_3BO_3$ | 10.0 | $Co(NO_3)_2 \cdot 6H_2O$ | 14.9 | " | 12 |
| 33 | A | 0.21 | 12:1 | " | 10.0 | $Co(CH_3COO)_2 \cdot 4H_2O$ | 13.0 | " | 12 |
| 34 | A | 0.21 | 12:1 | " | 10.0 | " | 13.0 | " | 12 |
| 35 | A | 0.15 | 9:1 | " | 10.0 | " | 13.0 | " | 12 |
| 36 | B | 0.15 | 10:1 | " | 10.0 | " | 13.0 | " | 12 |
| 37 | B | 0.22 | 13:1 | " | 10.0 | " | 13.0 | " | 12 |
| 38 | A | 0.21 | 12:1 | " | 20.0 | " | 13.0 | " | 12 |
| 39 | A | 0.21 | 12:1 | " | 10.0 | " | 22.0 | " | 12 |

| Examples | Nickel compound | |
|---|---|---|
|  | Kind | Content (wt %) |
| 21 | — | — |
| 22 | — | — |
| 23 | — | — |
| 24 | — | — |
| 25 | $Ni(CH_3COO)_2 \cdot 4H_2O$ | 1.4 |
| 26 | " | 15.0 |
| 27 | $Ni(NO_3)_2 \cdot 6H_2O$ | 1.7 |
| 28 | " | 17.3 |
| 29 | $Ni(CH_3COO)_2 \cdot 4H_2O$ | 1.4 |
| 30 | " | 1.4 |
| 31 | " | 1.4 |
| 32 | " | 1.4 |
| 33 | " | 1.4 |
| 34 | " | 1.4 |
| 35 | " | 1.4 |
| 36 | " | 1.4 |
| 37 | " | 1.4 |
| 38 | " | 1.4 |
| 39 | " | 1.4 |

(Note)
*Process A: Aqueous solution carbonate is used as aqueous alkali solution.
Process B: Aqueous solution hydroxide is used as aqueous alkali solution.

TABLE 4

| Reference Example | Acicular goethite particles Kind | Boron compound | | Cobalt compound | | Aluminum compound | |
|---|---|---|---|---|---|---|---|
|  |  | Kind | Content (wt %) | Kind | Content (wt %) | Kind | Content (wt %) |
| 1 | The same acicular goethite particles as those used in Example 21. | $H_3BO_3$ | 10.0 | $Co(CH_3COO)_2 \cdot 4H_2O$ | 13.0 | $Al(NO_3)_3 \cdot 9H_2O$ | 2.5 |
| 2 | The same acicular goethite particles as those used in Example 21. | " | 10.0 | " | 13.0 | " | 47.0 |
| 3 | The same acicular goethite particles as those used in Example 21. | " | 10.0 | " | 13.0 | — | — |
| 4 | The same acicular goethite particles as those used in Example 21. | " | 10.0 | " | 13.0 | — | — |

| Reference Example | Nickel compound | |
|---|---|---|
|  | Kind | Content (wt %) |
| 1 | — | — |

TABLE 4-continued

| | | | |
|---|---|---|---|
| | 2 | — | — |
| | 3 | Ni(CH₃COO)₂·4H₂O | 0.3 |
| | 4 | " | 34.0 |

TABLE 5

| Examples | Kind of acicular goethite particles (Example No.) | Heat-treatment Temperature (°C.) | Acicular hematite particles Particle length (μm) | Acicular hematite particles Aspect ratio (Major axis: Minor axis) |
|---|---|---|---|---|
| 40 | 21 | 400 | 0.19 | 11:1 |
| 41 | 22 | 400 | 0.19 | 11:1 |
| 42 | 23 | 400 | 0.19 | 11:1 |
| 43 | 24 | 400 | 0.19 | 11:1 |
| 44 | 25 | 400 | 0.19 | 11:1 |
| 45 | 26 | 400 | 0.19 | 11:1 |
| 46 | 27 | 400 | 0.19 | 11:1 |
| 47 | 28 | 400 | 0.19 | 11:1 |
| 48 | 29 | 400 | 0.19 | 11:1 |
| 49 | 30 | 400 | 0.19 | 11:1 |
| 50 | 31 | 400 | 0.19 | 11:1 |
| 51 | 32 | 400 | 0.19 | 11:1 |
| 52 | 33 | 350 | 0.20 | 11:1 |
| 53 | 34 | 500 | 0.19 | 10:1 |
| 54 | 35 | 400 | 0.14 | 8:1 |
| 55 | 36 | 400 | 0.12 | 8:1 |
| 56 | 37 | 400 | 0.19 | 11:1 |
| 57 | 38 | 400 | 0.19 | 11:1 |
| 58 | 39 | 400 | 0.19 | 11:1 |

TABLE 6

| Reference Examples | Kind of acicular goethite particles (Reference Example No.) | Heat-treatment Temperature (°C.) | Acicular hematite particles Particle length (μm) | Acicular hematite particles Aspect ratio (Major axis: Minor axis) |
|---|---|---|---|---|
| 5 | 1 | 400 | 0.19 | 11:1 |
| 6 | 2 | 400 | 0.19 | 11:1 |
| 7 | 3 | 400 | 0.19 | 11:1 |
| 8 | 4 | 400 | 0.19 | 11:1 |

TABLE 7

| Examples | Kind of acicular hematite particles (Example No.) | Heat-treatment in reducing atmosphere Temperature (°C.) | Heat-treatment in reducing atmosphere Time (hour) | B/Fe (mol %) | Co/Fe (mol %) | Al/Fe (mol %) | Ni/Fe (mol %) | Coercive force Hc (Oe) | Saturation magnetization σs (emu/g) | Change of saturation magnetization (%) |
|---|---|---|---|---|---|---|---|---|---|---|
| 59 | 40 | 420 | 6 | 4.7 | 4.5 | 2.6 | — | 1540 | 133 | 8.0 |
| 60 | 41 | 440 | 6 | 4.8 | 4.5 | 3.9 | — | 1520 | 131 | 8.0 |
| 61 | 42 | 410 | 6 | 4.7 | 4.5 | 2.6 | — | 1530 | 133 | 8.0 |
| 62 | 43 | 410 | 6 | 4.7 | 4.5 | 7.2 | — | 1530 | 132 | 7.0 |
| 63 | 44 | 400 | 6 | 4.7 | 4.5 | — | 0.5 | 1540 | 134 | 8.0 |
| 64 | 45 | 390 | 6 | 4.8 | 4.5 | — | 5.1 | 1530 | 133 | 8.0 |
| 65 | 46 | 400 | 6 | 4.7 | 4.5 | — | 0.5 | 1540 | 135 | 8.0 |
| 66 | 47 | 390 | 6 | 4.7 | 4.5 | — | 5.0 | 1520 | 133 | 8.0 |
| 67 | 48 | 410 | 6 | 4.7 | 4.5 | 2.6 | 0.5 | 1540 | 134 | 8.0 |
| 68 | 49 | 420 | 6 | 4.7 | 4.5 | 3.9 | 0.5 | 1520 | 132 | 8.0 |
| 69 | 50 | 410 | 6 | 4.6 | 4.5 | 2.6 | 0.5 | 1540 | 133 | 8.0 |
| 70 | 51 | 410 | 6 | 4.7 | 4.4 | 2.6 | 0.5 | 1530 | 132 | 8.0 |
| 71 | 52 | 410 | 6 | 4.7 | 4.5 | 2.6 | 0.5 | 1500 | 130 | 7.0 |
| 72 | 53 | 410 | 6 | 4.7 | 4.5 | 2.6 | 0.5 | 1550 | 135 | 8.0 |
| 73 | 54 | 410 | 6 | 4.7 | 4.5 | 2.6 | 0.5 | 1550 | 135 | 8.0 |
| 74 | 55 | 410 | 6 | 4.7 | 4.5 | 2.6 | 0.5 | 1550 | 134 | 8.0 |
| 75 | 56 | 410 | 6 | 4.7 | 4.5 | 2.6 | 0.5 | 1560 | 136 | 9.0 |
| 76 | 57 | 410 | 6 | 8.3 | 4.6 | 2.6 | 0.5 | 1570 | 131 | 8.0 |
| 77 | 58 | 410 | 6 | 4.9 | 7.3 | 2.6 | 0.5 | 1600 | 138 | 7.0 |

| Examples | Kind of acicular hematite particles (Example No.) | S.F.D. | Gloss (%) 50% dispersion Time | Gloss (%) 100% dispersion Time | Adsorbed resin content (g) | Particle length (μm) | Aspect ratio (Major axis: Minor axis) |
|---|---|---|---|---|---|---|---|
| 59 | 40 | 0.42 | 110 | 120 | 1.4 | 0.15 | 7:1 |
| 60 | 41 | 0.40 | 120 | 130 | 1.5 | 0.15 | 7:1 |
| 61 | 42 | 0.42 | 110 | 120 | 1.4 | 0.15 | 7:1 |
| 62 | 43 | 0.40 | 120 | 130 | 1.6 | 0.15 | 7:1 |
| 63 | 44 | 0.43 | 100 | 120 | 1.1 | 0.15 | 7:1 |
| 64 | 45 | 0.42 | 120 | 130 | 1.1 | 0.14 | 6:1 |
| 65 | 46 | 0.43 | 100 | 120 | 1.1 | 0.15 | 7:1 |
| 66 | 47 | 0.43 | 120 | 130 | 1.1 | 0.14 | 6:1 |
| 67 | 48 | 0.42 | 120 | 130 | 1.4 | 0.15 | 7:1 |
| 68 | 49 | 0.41 | 130 | 140 | 1.5 | 0.16 | 7:1 |
| 69 | 50 | 0.42 | 120 | 130 | 1.4 | 0.15 | 7:1 |
| 70 | 51 | 0.42 | 120 | 130 | 1.4 | 0.15 | 7:1 |
| 71 | 52 | 0.42 | 120 | 130 | 1.4 | 0.16 | 7:1 |
| 72 | 53 | 0.42 | 120 | 130 | 1.4 | 0.15 | 7:1 |
| 73 | 54 | 0.45 | 120 | 130 | 1.4 | 0.10 | 6:1 |
| 74 | 55 | 0.48 | 120 | 130 | 1.4 | 0.10 | 6:1 |
| 75 | 56 | 0.47 | 120 | 130 | 1.4 | 0.16 | 9:1 |
| 76 | 57 | 0.42 | 120 | 130 | 1.4 | 0.16 | 7:1 |

TABLE 7-continued

| | | | | | | | |
|---|---|---|---|---|---|---|---|
| 77 | 58 | 0.39 | 120 | 130 | 1.4 | 0.14 | 6:1 |

TABLE 8

| Reference Examples | Kind of acicular hematite particles (Reference Example No.) | Heat-treatment in reducing atmosphere | | Acicular magnetic iron based alloy particles | | | | | | |
|---|---|---|---|---|---|---|---|---|---|---|
| | | Temperature (°C.) | Time (hour) | B/Fe (mol %) | Co/Fe (mol %) | Al/Fe (mol %) | Ni/Fe (mol %) | Coercive force Hc (Oe) | Saturation magnetization $\sigma s$ (emu/g) | Change of saturation magnetization (%) |
| 9 | 5 | 410 | 6 | 4.7 | 4.5 | 0.5 | — | 1530 | 133 | 8.0 |
| 10 | 6 | 450 | 6 | 4.7 | 4.5 | 10.3 | — | 1400 | 121 | 6.0 |
| 11 | 7 | 410 | 6 | 4.7 | 4.5 | — | 0.1 | 1530 | 133 | 8.0 |
| 12 | 8 | 380 | 6 | 4.7 | 4.5 | — | 12.0 | 1210 | 112 | 7.0 |

| Reference Examples | Kind of acicular hematite particles (Reference Example No.) | Acicular magnetic iron based alloy particles | | | Adsorbed resin content (g) | Particle length (μm) | Aspect ratio (Major axis : Minor axis) |
|---|---|---|---|---|---|---|---|
| | | S.F.D. | Gloss (%) | | | | |
| | | | 50% dispersion Time | 100% dispersion Time | | | |
| 9 | 5 | 0.43 | 70 | 100 | 1.1 | 0.15 | 7:1 |
| 10 | 6 | 0.49 | 90 | 120 | 1.7 | 0.14 | 6:1 |
| 11 | 7 | 0.43 | 70 | 100 | 1.1 | 0.15 | 7:1 |
| 12 | 8 | 0.55 | 90 | 110 | 1.1 | 0.13 | 6:1 |

TABLE 9

| Examples | Acicular goethite particles | | | Boron compound | | Cobalt compound | | Silicon compound | |
|---|---|---|---|---|---|---|---|---|---|
| | Process* | Particle length (μm) | Aspect ratio (Major axis : Minor axis) | Kind | Content (wt %) | Kind | Content (wt %) | Kind | Content (wt %) |
| 78 | A | 0.20 | 13:1 | $H_3BO_3$ | 10.0 | $Co(CH_3COO)_2 \cdot 4H_2O$ | 13.0 | Colloidal silica | 9.5 |
| 79 | A | 0.20 | 13:1 | " | 10.0 | " | 13.0 | " | 29.0 |
| 80 | A | 0.20 | 13:1 | " | 10.0 | " | 13.0 | " | 19.0 |
| 81 | A | 0.20 | 13:1 | " | 10.0 | " | 13.0 | " | 29.0 |
| 82 | A | 0.20 | 13:1 | " | 10.0 | " | 13.0 | " | 19.0 |
| 83 | A | 0.20 | 13:1 | " | 10.0 | " | 13.0 | Water glass | 14.0 |
| 84 | A | 0.20 | 13:1 | $B_2O_3$ | 5.5 | " | 13.0 | Colloidal silica | 19.0 |
| 85 | A | 0.20 | 13:1 | $H_3BO_3$ | 10.0 | $Co(NO_3)_2 \cdot 6H_2O$ | 14.9 | " | 19.0 |
| 86 | A | 0.15 | 10:1 | " | 10.0 | $Co(CH_3COO)_2 \cdot 4H_2O$ | 13.0 | " | 19.0 |
| 87 | B | 0.15 | 11:1 | " | 10.0 | " | 13.0 | " | 19.0 |
| 88 | B | 0.23 | 13:1 | " | 10.0 | " | 13.0 | " | 19.0 |
| 89 | A | 0.20 | 13:1 | " | 20.0 | " | 13.0 | " | 19.0 |
| 90 | A | 0.20 | 13:1 | " | 10.0 | " | 22.0 | " | 19.0 |

| Examples | Aluminum compound | |
|---|---|---|
| | Kind | Content (wt %) |
| 78 | — | — |
| 79 | — | — |
| 80 | $Al(NO_3)_3 \cdot 9H_2O$ | 12.0 |
| 81 | Alumina sol | 8.1 |
| 82 | " | 22.4 |
| 83 | " | 8.1 |
| 84 | $Al(NO_3)_3 \cdot 9H_2O$ | 12.0 |
| 85 | " | 12.0 |
| 86 | " | 12.0 |
| 87 | " | 12.0 |
| 88 | " | 12.0 |
| 89 | " | 12.0 |
| 90 | " | 12.0 |

(Note)
*Process A: Aqueous sodium carbonate is used as aqueous alkali solution.
Process B: Aqueous sodium hydroxide is used as aqueous alkali solution.

TABLE 10

| Reference Examples | Acicular goethite particles Kind | Boron compound | | Cobalt compound | | Silicon compound | |
|---|---|---|---|---|---|---|---|
| | | Kind | Content (wt %) | Kind | Content (wt %) | Kind | Content (wt %) |
| 13 | The same acicular goethite particles as those used in Example 78. | $H_3BO_3$ | 10.0 | $Co(CH_3COO)_2 \cdot 4H_2O$ | 13.0 | Colloidal silica | 1.8 |
| 14 | The same acicular goethite particles as those used in | " | 10.0 | " | 13.0 | " | 48.0 |

TABLE 10-continued

Example 78.

| Reference Examples | Aluminum compound Kind | Content (wt %) |
|---|---|---|
| 13 | Al(NO$_3$)$_3$·9H$_2$O | 12.0 |
| 14 | " | 12.0 |

TABLE 11

| Examples | Kind of acicular goethite particles (Example No.) | Heat-treatment Temperature (°C.) | Acicular hematite particles Particle length (μm) | Aspect ratio (Major axis: Minor axis) |
|---|---|---|---|---|
| 91 | 78 | 400 | 0.19 | 11:1 |
| 92 | 79 | 400 | 0.19 | 11:1 |
| 93 | 80 | 400 | 0.19 | 11:1 |
| 94 | 80 | 350 | 0.20 | 11:1 |
| 95 | 80 | 500 | 0.19 | 10:1 |
| 96 | 81 | 400 | 0.19 | 11:1 |
| 97 | 82 | 400 | 0.19 | 11:1 |
| 98 | 83 | 400 | 0.19 | 11:1 |
| 99 | 84 | 400 | 0.19 | 11:1 |
| 100 | 85 | 400 | 0.19 | 11:1 |
| 101 | 86 | 400 | 0.14 | 8:1 |
| 102 | 87 | 400 | 0.12 | 8:1 |
| 103 | 88 | 400 | 0.19 | 11:1 |
| 104 | 89 | 400 | 0.19 | 11:1 |

TABLE 11-continued

| Examples | Kind of acicular goethite particles (Example No.) | Heat-treatment Temperature (°C.) | Acicular hematite particles Particle length (μm) | Aspect ratio (Major axis: Minor axis) |
|---|---|---|---|---|
| 105 | 90 | 400 | 0.19 | 11:1 |

TABLE 12

| Reference Examples | Kind of acicular goethite particles (Reference Example No.) | Heat-treatment Temperature (°C.) | Acicular hematite particles Particle length (μm) | Aspect ratio (Major axis: Minor axis) |
|---|---|---|---|---|
| 15 | 13 | 400 | 0.19 | 11:1 |
| 16 | 14 | 400 | 0.19 | 11:1 |

TABLE 13

| Examples | Kind of acicular hematite particles (Example No.) | Heat-treatment in reducing atmosphere Temperature (°C.) | Time (hour) | B/Fe (mol %) | Co/Fe (mol %) | SiO$_2$/Fe (mol %) | Al/Fe (mol %) | Coercive force Hc (Oe) | Saturation magnetization σs (emu/g) | Change of saturation magnetization (%) |
|---|---|---|---|---|---|---|---|---|---|---|
| 106 | 91 | 410 | 6 | 4.7 | 4.5 | 2.4 | — | 1560 | 133 | 8.0 |
| 107 | 92 | 430 | 6 | 4.7 | 4.5 | 6.9 | — | 1620 | 131 | 5.0 |
| 108 | 93 | 430 | 6 | 4.7 | 4.5 | 4.7 | 2.6 | 1580 | 133 | 7.0 |
| 109 | 94 | 410 | 6 | 4.7 | 4.5 | 4.7 | 2.6 | 1540 | 130 | 6.0 |
| 110 | 95 | 410 | 6 | 4.7 | 4.5 | 4.7 | 2.6 | 1590 | 135 | 7.0 |
| 111 | 96 | 420 | 6 | 4.7 | 4.5 | 6.9 | 2.6 | 1610 | 130 | 5.0 |
| 112 | 97 | 410 | 6 | 4.7 | 4.5 | 4.7 | 7.2 | 1570 | 132 | 7.0 |
| 113 | 98 | 410 | 6 | 4.7 | 4.5 | 4.6 | 2.6 | 1580 | 133 | 7.0 |
| 114 | 99 | 410 | 6 | 4.6 | 4.5 | 4.7 | 2.6 | 1580 | 132 | 7.0 |
| 115 | 100 | 410 | 6 | 4.7 | 4.4 | 4.7 | 2.6 | 1570 | 135 | 7.0 |
| 116 | 101 | 410 | 6 | 4.7 | 4.5 | 4.7 | 2.6 | 1590 | 135 | 7.0 |
| 117 | 102 | 410 | 6 | 4.7 | 4.5 | 4.7 | 2.6 | 1590 | 134 | 7.0 |
| 118 | 103 | 410 | 6 | 4.7 | 4.5 | 4.7 | 2.6 | 1600 | 135 | 8.0 |
| 119 | 104 | 410 | 6 | 8.3 | 4.6 | 4.7 | 2.6 | 1610 | 131 | 8.0 |
| 120 | 105 | 410 | 6 | 4.9 | 7.3 | 4.7 | 2.6 | 1640 | 138 | 6.0 |

| Examples | Kind of acicular hematite particles (Example No.) | S.F.D. | Acicular magnetic iron based alloy particles Specific surface area (m$^2$/g) | Particle length (μm) | Aspect ratio (Major axis: Minor axis) |
|---|---|---|---|---|---|
| 106 | 91 | 0.43 | 49.8 | 0.15 | 7:1 |
| 107 | 92 | 0.44 | 53.3 | 0.15 | 7:1 |
| 108 | 93 | 0.42 | 51.6 | 0.15 | 7:1 |
| 109 | 94 | 0.42 | 52.0 | 0.16 | 7:1 |
| 110 | 95 | 0.42 | 51.0 | 0.15 | 7:1 |
| 111 | 96 | 0.42 | 55.0 | 0.15 | 7:1 |
| 112 | 97 | 0.40 | 57.6 | 0.15 | 7:1 |
| 113 | 98 | 0.42 | 51.1 | 0.15 | 7:1 |
| 114 | 99 | 0.42 | 51.3 | 0.15 | 7:1 |
| 115 | 100 | 0.41 | 51.1 | 0.15 | 7:1 |
| 116 | 101 | 0.45 | 49.9 | 0.10 | 6:1 |
| 117 | 102 | 0.48 | 51.3 | 0.10 | 6:1 |
| 118 | 103 | 0.47 | 54.5 | 0.16 | 9:1 |
| 119 | 104 | 0.42 | 51.0 | 0.16 | 7:1 |
| 120 | 105 | 0.40 | 50.9 | 0.14 | 6:1 |

TABLE 14

| Kind of acicular | Acicular magnetic iron based alloy particles |
|---|---|

TABLE 14-continued

| Reference Examples | hematite particles (Reference Example No.) | Heat-treatment in reducing atmosphere | | B/Fe (mol %) | Co/Fe (mol %) | SiO$_2$/Fe (mol %) | Al/Fe (mol %) | Coercive force Hc (Oe) | Saturation magnetization σs (emu/g) | Change of saturation magnetization (%) |
|---|---|---|---|---|---|---|---|---|---|---|
| | | Temperature (°C.) | Time (hour) | | | | | | | |
| 17 | 15 | 410 | 6 | 4.7 | 4.5 | 0.5 | 2.6 | 1530 | 133 | 8.0 |
| 18 | 16 | 450 | 6 | 4.7 | 4.5 | 11.4 | 2.6 | 1600 | 98 | 5.0 |

| | Kind of acicular hematite particles (Reference Example No.) | Acicular magnetic iron based alloy particles | | | |
|---|---|---|---|---|---|
| Reference Examples | | S.F.D. | Specific surface area (m$^2$/g) | Particle length (μm) | Aspect ratio (Major axis: Minor axis) |
| 17 | 15 | 0.43 | 43.2 | 0.15 | 7:1 |
| 18 | 16 | 0.56 | 62.4 | 0.16 | 8:1 |

What is claimed is:

1. A process for producing acicular magnetic iron based alloy particles for magnetic recording containing boron and cobalt in the vicinity of the surfaces thereof, said process comprising the steps of:

coating the surfaces of acicular goethite particles with a boron compound and a cobalt compound;

heat-treating said particles in a temperature range of 300° to 600° C. to obtain acicular hematite particles coated with a boron oxide and a cobalt oxide; and heat-treating said acicular hematite particles in a temperature range of 300° to 500° C. in a reducing atmosphere.

2. A process according to claim 1, wherein said acicular magnetic iron based alloy particles have a saturation magnetization of not less than 125 emu/g and S.F.D. value of not more than 0.50.

* * * * *